United States Patent
Wyble et al.

(10) Patent No.: US 11,410,400 B2
(45) Date of Patent: Aug. 9, 2022

(54) METHOD AND SYSTEM FOR MAINTAINING COLOR CALIBRATION USING COMMON OBJECTS

(71) Applicant: PCMS Holdings, Inc., Wilmington, DE (US)

(72) Inventors: David Wyble, Webster, NY (US); Patrick Igoe, Bala Cynwyd, PA (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/958,490

(22) PCT Filed: Dec. 21, 2018

(86) PCT No.: PCT/US2018/067206
§ 371 (c)(1),
(2) Date: Jun. 26, 2020

(87) PCT Pub. No.: WO2019/133505
PCT Pub. Date: Jul. 4, 2019

(65) Prior Publication Data
US 2021/0065459 A1 Mar. 4, 2021

Related U.S. Application Data

(60) Provisional application No. 62/612,140, filed on Dec. 29, 2017.

(51) Int. Cl.
*G06T 19/20* (2011.01)
*G02B 27/01* (2006.01)
(Continued)

(52) U.S. Cl.
CPC ............ *G06T 19/20* (2013.01); *G02B 27/017* (2013.01); *G06F 3/013* (2013.01); *G06T 19/003* (2013.01);
(Continued)

(58) Field of Classification Search
CPC ...... G06T 19/20; G06T 19/003; G06T 19/006; G06F 3/013; G02B 27/017
(Continued)

(56) References Cited

U.S. PATENT DOCUMENTS

| 7,173,622 B1 | 2/2007 | McLaughlin |
| 7,587,068 B1 | 9/2009 | Steinberg |

(Continued)

FOREIGN PATENT DOCUMENTS

| EP | 2920766 A2 | 9/2015 |
| WO | 2015192117 A1 | 12/2015 |

OTHER PUBLICATIONS

International Search Report and Written Opinion of the International Searching Authority for PCT/US2018/067206 dated Mar. 14, 2019, 9 pages.
(Continued)

*Primary Examiner* — Thomas J Lett
(74) *Attorney, Agent, or Firm* — Invention Mine LLC

(57) ABSTRACT

Described herein are systems and methods for maintaining color calibration using common objects. In an exemplary embodiment, an AR system includes a forward-facing camera, an AR display, a processor, and a user interface. The processor is configured to receive image data from the forward-facing camera and identify any known objects depicted in the image data. The processor then determines RGB information at least one test rendering of the identified known object and displays it via the AR display. Input from a user interface, indicating which of the at least one test renderings was a closest match to the real-world object, and a level of satisfaction with the match are received by the processor and used to update an AR display color calibration model. More test renderings may be iteratively provided to improve the accuracy of the calibration.

20 Claims, 15 Drawing Sheets

(51) Int. Cl.
*G06F 3/01* (2006.01)
*G06T 19/00* (2011.01)
*G06V 20/20* (2022.01)

(52) U.S. Cl.
CPC ............ *G06T 19/006* (2013.01); *G06V 20/20* (2022.01); *G02B 2027/0112* (2013.01); *G06T 2219/2012* (2013.01)

(58) Field of Classification Search
USPC .......................................................... 345/419
See application file for complete search history.

(56) References Cited

U.S. PATENT DOCUMENTS

| | | | |
|---|---|---|---|
| 8,154,612 | B2 | 4/2012 | Quan |
| 8,811,729 | B2 | 8/2014 | Finlayson |
| 8,855,412 | B2 | 10/2014 | Quan |
| 9,070,192 | B1* | 6/2015 | Smith ........................ G06T 7/90 |
| 11,156,843 | B2* | 10/2021 | Freese ........................ G06T 7/85 |
| 2007/0043527 | A1 | 2/2007 | Quan |
| 2007/0065006 | A1 | 3/2007 | Wilensky |
| 2007/0104472 | A1 | 5/2007 | Quan |
| 2010/0321409 | A1* | 12/2010 | Komori ................. G02B 27/017 345/656 |
| 2011/0024128 | A1 | 2/2011 | Kaminsky |
| 2015/0054980 | A1 | 2/2015 | Nikkanen |
| 2016/0270656 | A1* | 9/2016 | Samec ................... A61B 3/063 |
| 2016/0366331 | A1 | 12/2016 | Barron |
| 2017/0122725 | A1* | 5/2017 | Yeoh .................... G02B 27/017 |
| 2017/0124928 | A1* | 5/2017 | Edwin ...................... G06T 15/20 |
| 2017/0221273 | A1 | 8/2017 | Haseltine |
| 2020/0410772 | A1* | 12/2020 | Silverstein ................ G06T 7/70 |
| 2021/0004995 | A1* | 1/2021 | Burg ..................... G06T 11/001 |

OTHER PUBLICATIONS

International Search Report and Written Opinion of the International Searching Authority for PCT/US2019/062846, dated Apr. 8, 2020, 12 pages.

Cheng, Dongliang, et al., "Effective Learning-Based Illuminant Estimation Using Simple Features". IEEE Conference an Computer Vision and Pattern Recognition (CVPR), (2015), pp. 1000-1008.

Zhao, Yonghui, et al., "Methods of Spectral Reflectance Reconstruction for A Sinarback 54 Digital Camera". Rochester Institute of Technology, RIT Scholar Works, Dec. 2004, 37 pages.

"Facial Recognition Technology: Commercial Uses, Privacy Issues, and Applicable Federal Law." United States Government Accountability Office, Report ID GAO-15-621, Jul. 2015, 54 pages.

Angelopoulou, Elli, "The Reflectance Spectrum of Human Skin" Technical Reports (CIS), Univ. of Pennsylvania, Dept, of Computer and Information Science, Dec. 20, 1999, 16 pages.

Angelopoulou, Elli, "Understanding the Color of Human Skin". Human Vision and Electronic Imaging VI, vol. 4299, International Society for Optics and Photonics, (2001), 9 pages.

Long, Jeremy, et al., "One-Click White Balance using Human Skin Reflectance". Graphics Interface Conference, May 25-27, 2009, pp. 55-62.

Chen, Xiaowu, et al., "Single Image Based Illumination Estimation for Lighting Virtual Object in Real Scene". 12th IEEE International Conference on Computer-Aided Design and Computer Graphics, (2011), pp. 450-455.

Störring, Moritz, et al., "Estimation of the Illuminant Colour from Human Skin Colour". 4th IEEE International Conference on Automatic Face and Gesture Recognition, Mar. 26-30, 2000, pp. 1-7.

Inouye, Michael, "Evolution of Mobile Video". ABI Research for Visionaries, Jul. 2019, 14 pages.

Bianco, Simone, et al., "Color Constancy Using Faces". IEEE Conference on Computer Vision and Pattern Recognition, (2012), pp. 65-72.

International Colour Consortium "Display Calibration". Web Archive dated Dec. 28, 2017, available at: https://web.archive.org/web/20171228205105/www.color.org/displaycalibration.xalter, 3 pages.

"Colorimetry". CIE Publication No. 15, 3rd edition, International Commission on Illustration, Technical Report, (2004), 10 pages.

Bianco, Simone, et al., "Adaptive Color Constancy Using Faces". IEEE Transactions on Pattern Analysis and Machine Intelligence, vol. 36, No. 8, Aug. 2014, pp. 1505-1518.

International Preliminary Report on Patentability for PCT/US2018/067206 dated Jun. 30, 2020, 6 pages.

Judd, Deane B., et al., "Spectral Distribution of Typical Daylight as a Function of Correlated Color Temperature". Journal of the Optical Society of America, vol. 54, Issue 8, (1964), pp. 1031-1040.

\* cited by examiner

|  | User Intervention | |
|---|---|---|
|  | YES | NO |
| Inside Measurement Device — NO | User controlled<br>Case 1 | N/A |
| Inside Measurement Device — YES | User controlled, also update inside camera model<br>Case 2 | Easiest computer controlled method<br>Case 3 |

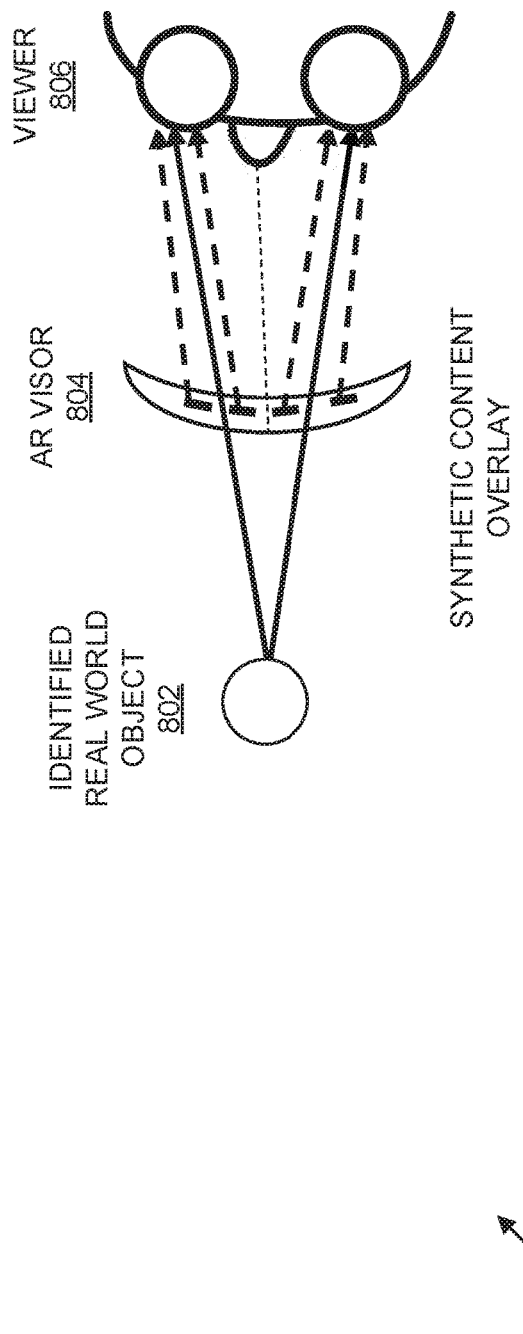
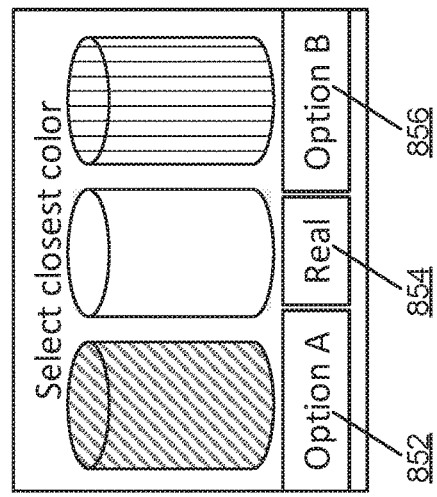
FIG. 8A
FIG. 8B

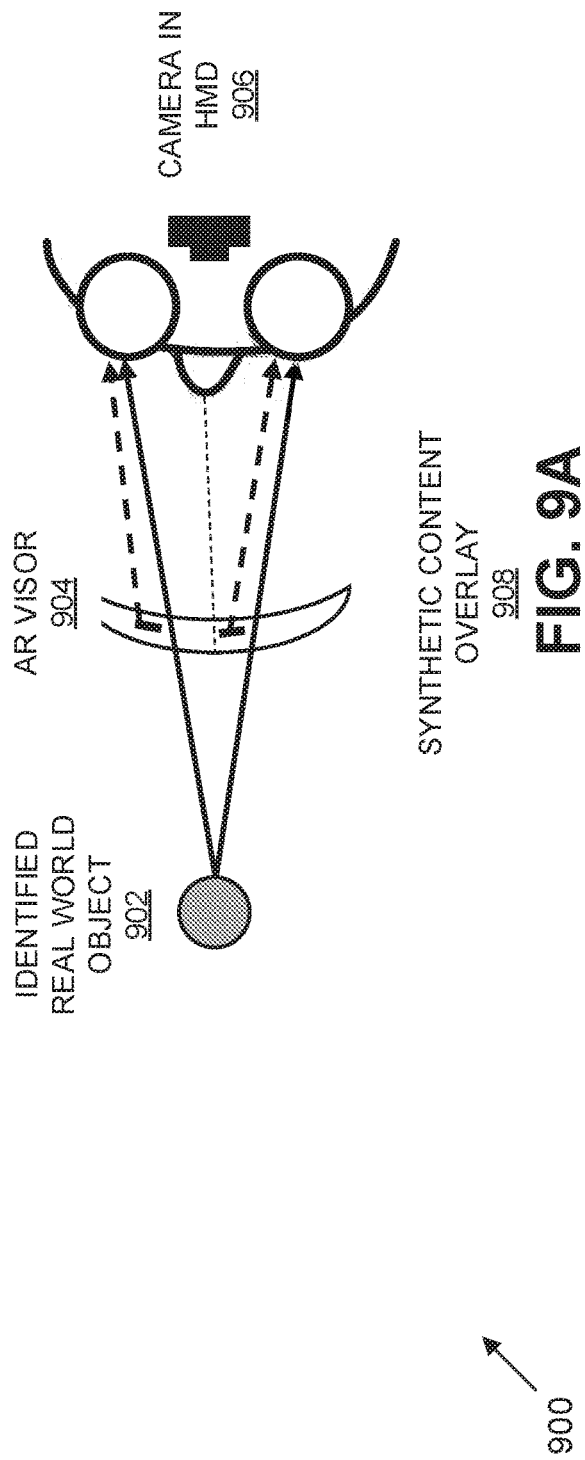
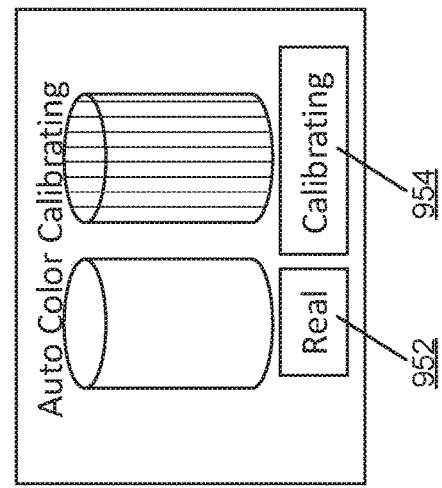

METHOD AND SYSTEM FOR MAINTAINING COLOR CALIBRATION USING COMMON OBJECTS

CROSS-REFERENCE TO RELATED APPLICATIONS

The present application is a national stage application under 35 U.S.C. 371 of International Application No. PCT/US2018/067206, entitled "METHOD AND SYSTEM FOR MAINTAINING COLOR CALIBRATION USING COMMON OBJECTS", filed on Dec. 21, 2018, which claims benefit under 35 U.S.C. § 119(e) from U.S. Provisional Patent Application Ser. No. 62/612,140, entitled "Method and System for Maintaining Color Calibration Using Common Objects," filed Dec. 29, 2017, which is hereby incorporated by reference in its entirety.

BACKGROUND

The aim of color calibration is to measure and/or adjust the color response of a device (input or output) to a known state. In International Color Consortium (ICC) terms, this is the basis for an additional color characterization of the device and later profiling. In non-ICC workflows, calibration refers sometimes to establishing a known relationship to a standard color space in one go. Color calibration is a requirement for all devices taking an active part of a color-managed workflow.

Input data can come from device sources like digital cameras, image scanners or any other measuring devices. Those inputs can be either monochrome (in which case only the response curve needs to be calibrated, though in a few select cases one must also specify the color or spectral power distribution that that single channel corresponds to) or specified in multidimensional color—most commonly in the three channel RGB model. Input data is in most cases calibrated against a profile connection space (PCS).

Color calibration is used by many industries, such as television production, gaming, photography, engineering, chemistry, medicine and more.

Traditional computer displays require individual characterization when used in applications requiring the most accurate color reproduction. Augmented reality systems will similarly benefit from individual calibrations to ensure an accurate and believable presentation of mixed content (real world, and synthetic imagery). Augmented reality systems may call for even better accuracy since the real world and synthetic content are by definition in the same scene, and typically immediately adjacent in the field of view. Such adjacency presents the worst case scenario for color matching, and therefore the most stringent color reproduction is advantageous.

Frequent calibration of an augmented reality display system is beneficial to maintain the highest level of color reproduction accuracy. The users' experience will be diminished if they are required to view color charts or other traditional characterization targets in order to maintain this high accuracy. A one-time factory calibration is not sufficient as it cannot account for changes in the display over time.

SUMMARY

A calibrated forward-facing camera or spectrometer continuously captures image data of a real-world scene of an augmented reality (AR) system. In some embodiments, the camera system (or alternatively, a second camera system) is inside an AR headset (e.g. AR goggles), and can also detect inserted synthetic imagery. A calibration procedure (like eye tracking) can be used to align the camera image with what the observer is seeing. A processor in control of the AR system is in communication with a color database of known objects, such as products, logos, and even natural artifacts such as grass and sky. When an object from the database is recognized in the real-world field of view, the processor recalibrates the display using at least one of two methods:

1) With user intervention: The user is presented with two versions of the known object (e.g.: one version displayed on either side of the real-world object. The user selects the closest visual match. This process may be iterated.
2) Without user intervention: The processor displays a best current estimate of a matching color overlaid on the real-world object. The inside camera captures the scene and the processor compares the color of the real-world object to the (synthetic) estimation. The measured and desired colors are compared, and if their values are within a threshold color difference, the calibration is complete. This process is fully-automated. The color difference threshold may be a built-in default value or set/controlled by the user (e.g., depending on their specific application).

The recalibration of the AR display operates to improve the color accuracy of the synthetic imagery. The fully-automated embodiments disclosed herein are least obtrusive for the user. The embodiments with user-intervention provide a color calibration result that is tuned for the particular color vision of the user.

BRIEF DESCRIPTION OF THE DRAWINGS

FIG. 2 depicts a chart relating various use cases and their conditions to applicable procedures, in accordance with at least one embodiment.

FIG. 8A depicts a visual overview of a first example scenario involving a traditional HMD, and FIG. 8B depicts a corresponding AR color calibration interface view presented to a user, in accordance with at least one embodiment.

FIG. 9A depicts a visual overview of a first example scenario involving an HMD with an internal measurement camera, and FIG. 9B depicts a corresponding AR color calibration interface view presented to a user, in accordance with at least one embodiment.

DETAILED DESCRIPTION

Abbreviations.
AR Augmented Reality
3D Three-Dimensional
HMD Head-Mounted Display
FOV Field-of-View
RGB Red-Green-Blue (Color Pixel)
Introduction.

Figure 12A:
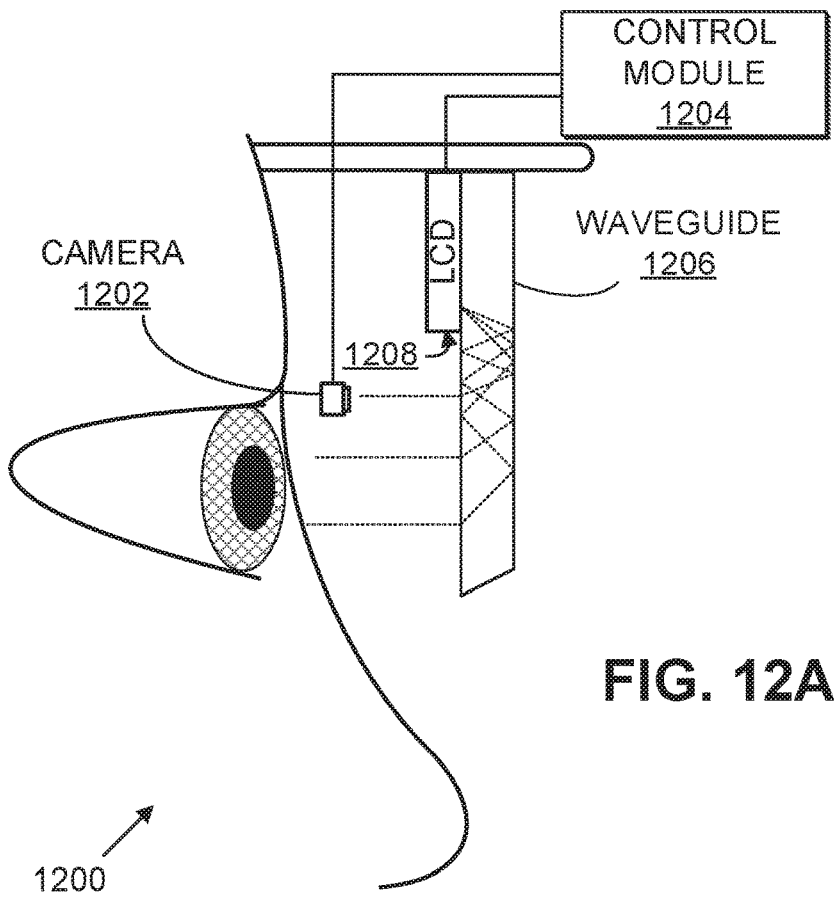
FIGS. 12A and 12B are schematic illustrations of AR displays according to exemplary embodiments.
Figure 12B:
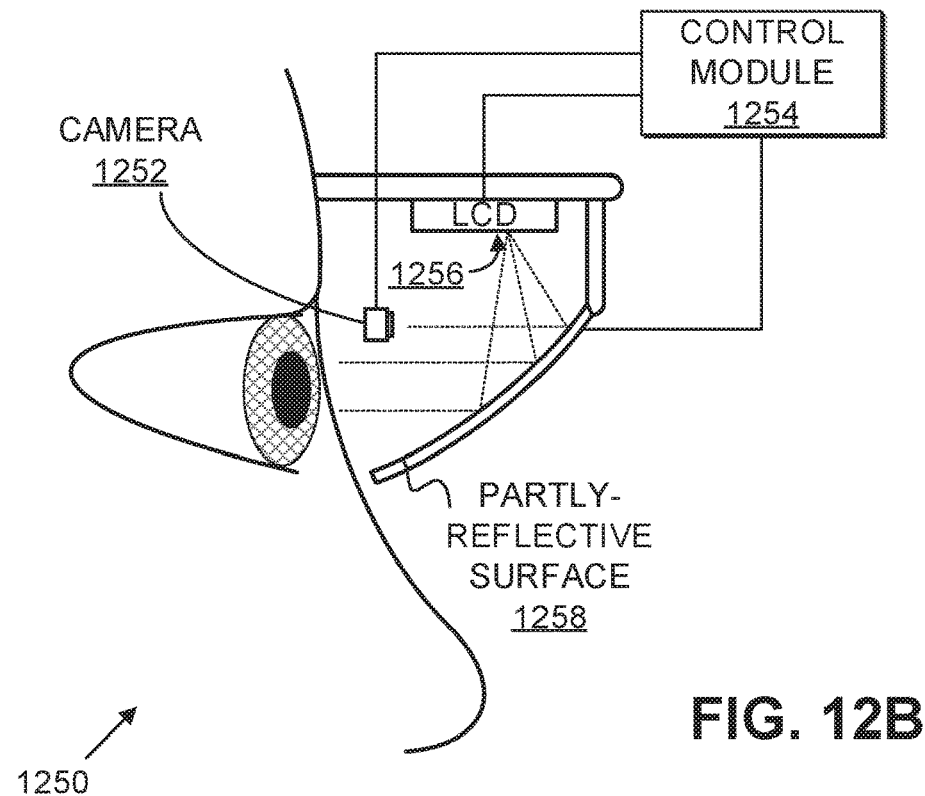

Disclosed herein are methods and systems for maintaining color calibration using common objects. Such methods and systems may be embodied as a process that takes place in an AR system, such as an AR HMD or an AR server, and as the AR system itself. Various embodiments take the form of a procedural method. In the embodiments described herein, a calibrated forward-facing camera or spectrometer continuously captures image data of a real-world scene of an AR system. In some embodiments, the camera system (or alternatively, a second camera system) is inside the AR goggles, and can detect the real-world scene as well as inserted synthetic imagery. A processor in control of the AR system communicates with a color database of known objects, such as products, logos, and even natural artifacts such as grass and sky. When an object from the database is recognized in the real-world field of view, the processor recalibrates the display. Exemplary configurations of AR systems in some embodiments are illustrated in FIGS. 12A and 12B. In those schematic illustrations, the camera is mounted behind the display surface of the goggles, but outside the observer's view (e.g. above, below, or to the side of the observers view). In some embodiments, the AR system is provided with eye tracking to align the camera image with the user's view.

Advantages.

The recalibration of the AR display helps to improve the color accuracy of the synthetic imagery. Fully-automated embodiments disclosed herein are minimally obtrusive for a user, whereas embodiments comprising user feedback provide a means for the display to be tuned for a particular color vision of the user.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment."

Moreover, any of the variations and permutations described in the ensuing paragraphs and anywhere else in this disclosure can be implemented with respect to any embodiments, including with respect to any method embodiments and with respect to any system embodiments.

Exemplary Color Database.

Exemplary methods described herein make use of a database of identifiable objects and their color or spectral properties. Prior to executing the disclosed method, a database is created or identified and its contents are made available to a device or process embodying the teachings herein. The database may be constructed to include data used by one or more known object recognition techniques. Collecting this data may be performed in a way that accounts for the fact that objects may be imaged from unknown viewpoints and under unknown and/or complex lighting, both spectrally and spatially. For the balance of this disclosure, exemplary methods are described for a case involving diffuse illumination and directional detection. However, this condition is not meant to be limiting in any way, as the database could easily be expanded to include more complex lighting conditions. The omission of references to more complex scenarios is done solely for the sake of brevity and clarity.

The data in this database of identifiable objects and their color or spectral properties can be acquired using several means, including: actual measurements of specific materials; estimates from product trade literature (e.g.: Pantone colors); other databases (for traditional materials such as grass, sky, brick, skin, etc.); and the like. In at least one embodiment, the dataset includes color coordinates (CIELAB or other). In some embodiments, spectral reflectance data is captured. It is possible that data for certain materials or products can be measured by an entity planning on implementing the process. In such a scenario, the entity planning on implementing the process may or may not make that data publicly available. Properties that are associated with each object may include one or more of the following:

Spectral reflectance factor. In some embodiments, the spectral reflectance factor is data measured under known standard reference conditions, e.g. measurements under known angles of illumination and detection such as a measurement of bidirectional reflectance (e.g. illumination at 45° and measurement at 0°) or hemispherical reflectance. In some embodiments, a bidirectional reflectance distribution (BRDF) or more generally bidirectional scattering distribution function (BSDF) is used to characterize Fluorescent behavior. In some embodiments, fluorescence is characterized by a Donaldson matrix as described in R. Donaldson, Spectrophotometry of fluorescent pigments, Br. J. Appl. Phys. 5 (1954) 210-214. The matrix may be determined using appropriate measurement apparatus, and completely characterizes the spectral reflectance as a function of the wavelength of the incident light. In some embodiments, fluorescence information may be determined based on material properties of the identified object. For example, fluorescent papers typically exhibit similar fluorescent behavior, as do common "Day-glo" fluorescent safety objects.

Gloss. Gloss data may be data collected by a gloss meter under a set of standard reference conditions. Depending on the object, the specification may be 80° gloss (for diffuse materials); 60° gloss (semi-gloss materials) or 20° gloss (for glossy materials). Other angles are possible, but these are the most common.

Logo font.

In some embodiments, the database can be expanded by storing measured properties of new objects encountered by the user. A validation mechanism may be applied in this case, since there is not necessarily a ground truth color on which to base any calibration. It would be appropriate in this scenario to query a user to ensure that a post-calibration color-match is sufficient. Then the color may be estimated by a forward facing camera and a calibration model. For better ground truth color data, an integrating sphere spectroradiometer could be used to measure the data and/or an integrated spectroradiometer could be included in the AR HMD device.

Detailed Process and Structure.

Figure 1:
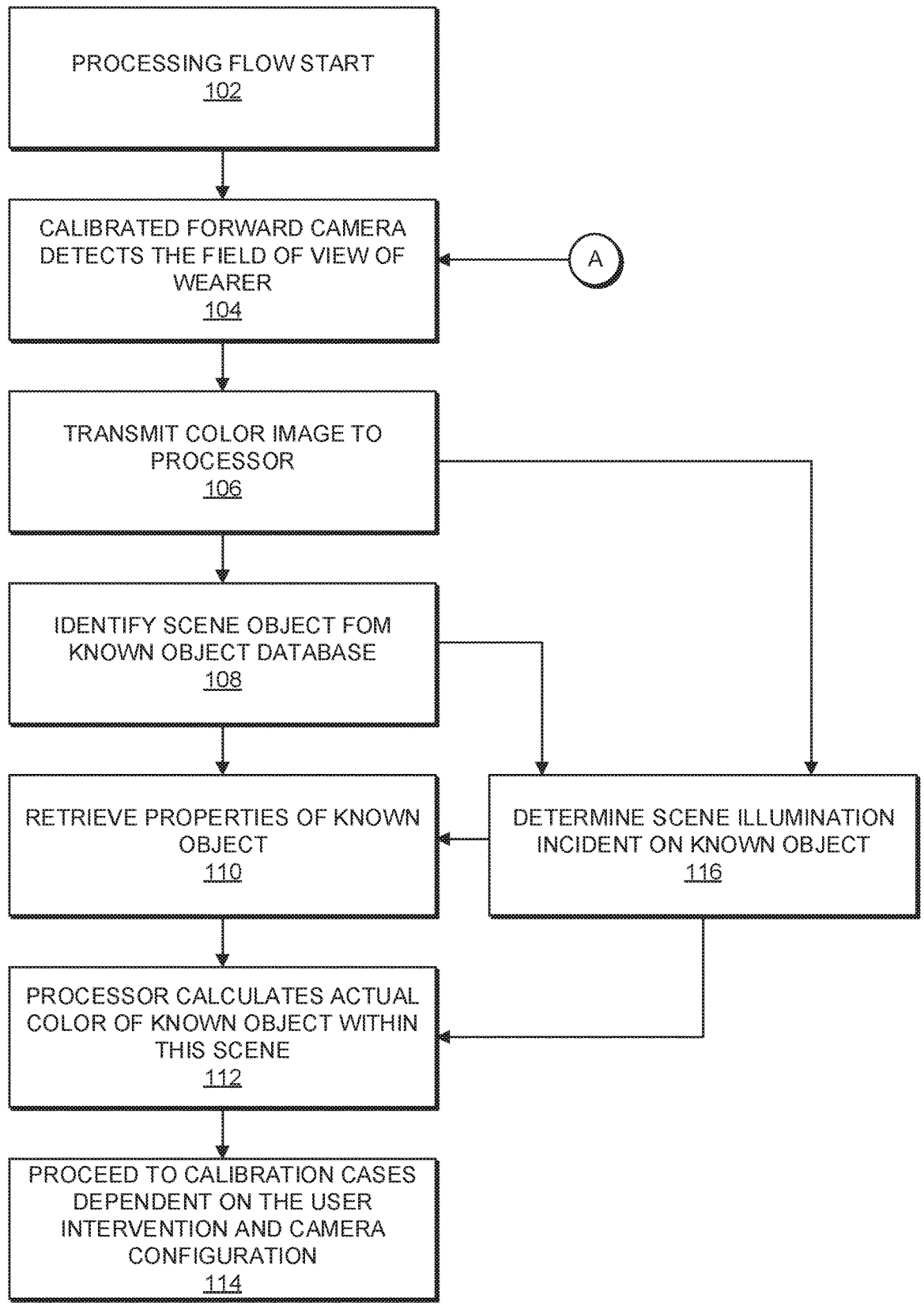
FIG. 1 depicts an outline of a processing flow for identifying a common object and calculating its color, in accordance with at least one embodiment.

Disclosed herein is a set of procedures and apparatuses which correspond to various use cases. FIG. 1 relates to procedure and depicts an exemplary processing flow 100. FIG. 1 depicts a processing flow start 102 that includes identifying a common object using a forward-facing camera and calculating its actual color within a present AR scene.

In flow 100, a calibrated forward-facing camera images a present field of view to generate color image data and detects the field of view of a wearer 104. In some embodiments the forward-facing camera is mounted on an AR HMD. In some embodiments the forward-facing camera is embedded in an AR HMD. The color image data is received at a processor 106 (of the HMD or of an AR server) and the processor uses this data to identify an object in the scene that matches an object in a known-object database at step 108. Flow 100 further includes determining a present scene illumination that is incident on the identified object at least in part by using the image data received at the processor 116. The determined scene illumination, together with color or spectral properties obtained from the known-object database, are used by the processor to calculate an actual color of the identified object under lighting conditions in the present scene. Step 110 includes retrieving properties of any known object. It should be noted that the actual color here is a function of only the database-obtained known-object properties and the real-world illumination estimated using the image data. In at least one embodiment, the real-world illumination is estimated, at least in part, by comparing the image data from the forward-facing camera with the properties obtained from the known-object database. Step 112 provides for a processor calculating actual color of any known object with the scene. At this point, "actual color" accounts for only the real-world illumination and the object properties. Therefore, this is the color of the light incident on the goggles (HMD) after reflecting of the object. There are no goggle properties considered yet. Thus, display/rendering properties of the AR device worn by a user are not involved in determining the actual color of the object.

Use cases 1-3 are outlined in a chart depicted in FIG. 2. FIG. 2 200 depicts a chart relating various use cases and their conditions to applicable procedures, in accordance with at least one embodiment. The chart shows which use cases are applicable based on whether there is user intervention or not, and whether or not there is an image sensor (an inside measurement device) in view of an HMD display surface.

Use case 1 corresponds to an AR HMD device that does not have a camera sensor in view of an AR display surface. A user interacts with the AR HMD to request and control color calibration. Flow 300, which is applicable for use case 1 in chart 20 is discussed below, in the description of FIG. 3.

Use cases 2 and 3 both correspond to an AR HMD device that does have a camera sensor in view of an AR display surface. The camera sensor may be the forward-facing camera discussed in relation to FIG. 1 if the forward-facing camera of FIG. 1 has a field of view (FOV) that includes the AR display surface. Alternatively, the camera sensor may be included in the HMD in addition to the forward-facing camera of FIG. 1, e.g., when the forward-facing camera of FIG. 1 is not in a position/orientation that includes the AR display surface in its FOV. In use case 2, a user interacts with the AR HMD to request and/or control color calibration, but also, the camera sensor in view of the AR display surface sends image data to the processor which relates this data to user input data for tuning an automatic color calibration model. The procedure C, which is applicable for use case 2, is outlined in FIG. 3. In use case 3, no user interaction nor intervention is involved. The color calibration process is fully-automated through use of the automatic color calibration model.

Figure 6:
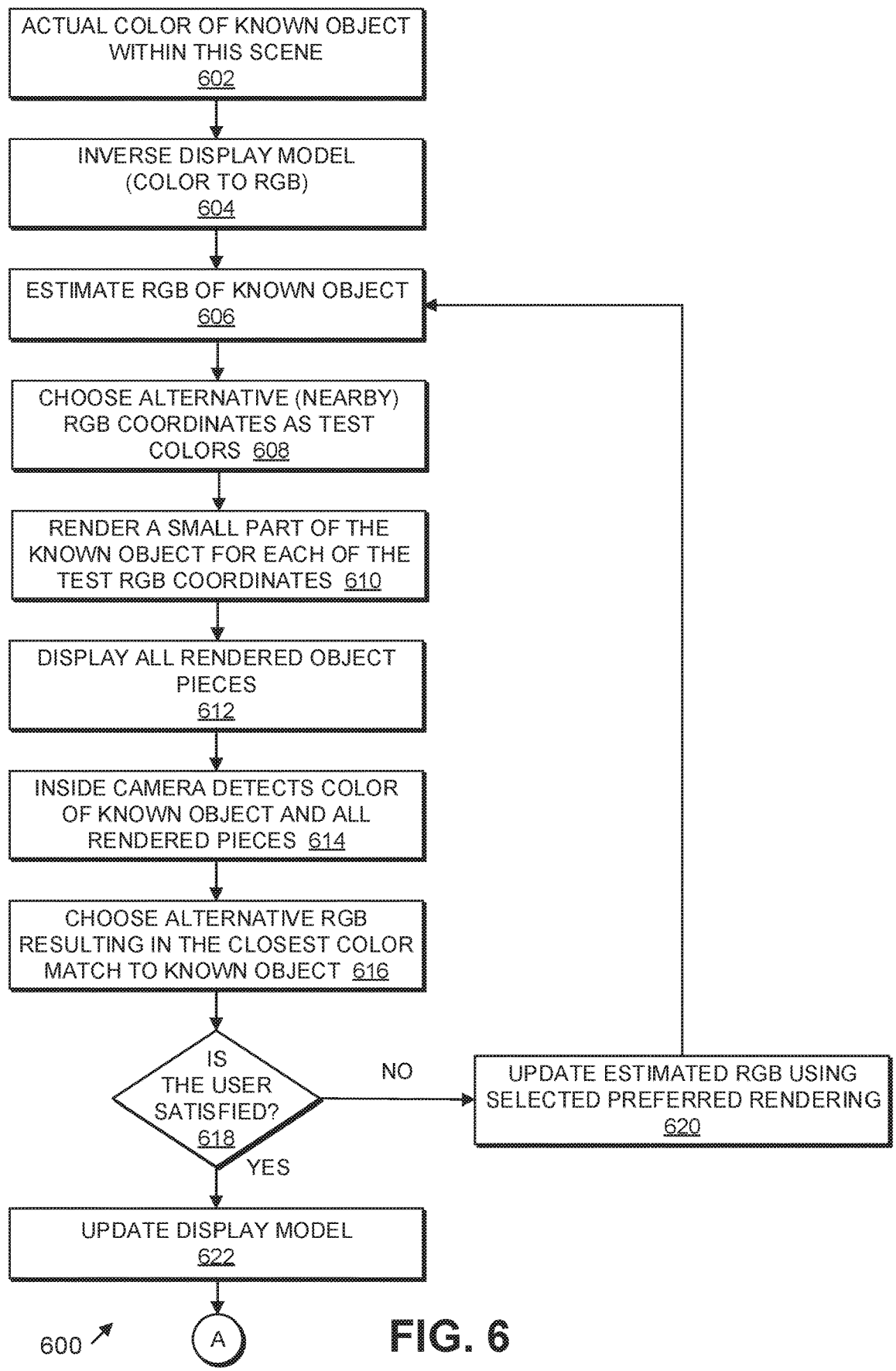
FIG. 6 depicts an outline of a fully-automated color calibration procedure, for an AR display system that includes an internal measurement imaging device, in accordance with at least one embodiment.

The flow procedure for use case 3, is described in relation to FIG. 6.

Note that there is nothing precluding a particular AR system from using multiple of the methods described above, and, in fact, a large plurality of possible embodiments, not listed for the sake of brevity, do include various combinations of certain elements from these procedures. For example, the fully-automated method associated with use case 3 can run continuously in the background, and the user could trigger a manual calibration if they feel the color reproduction is less than optimal via a user interface of the AR device. Then, the user could reengage the fully-automated procedure, knowing that they do not want a visual disruption in their FOV during the coming moments. The procedures outlined in table 200 may be used sequentially to first tune and then run the fully-automated AR color calibration process.

Figure 3:
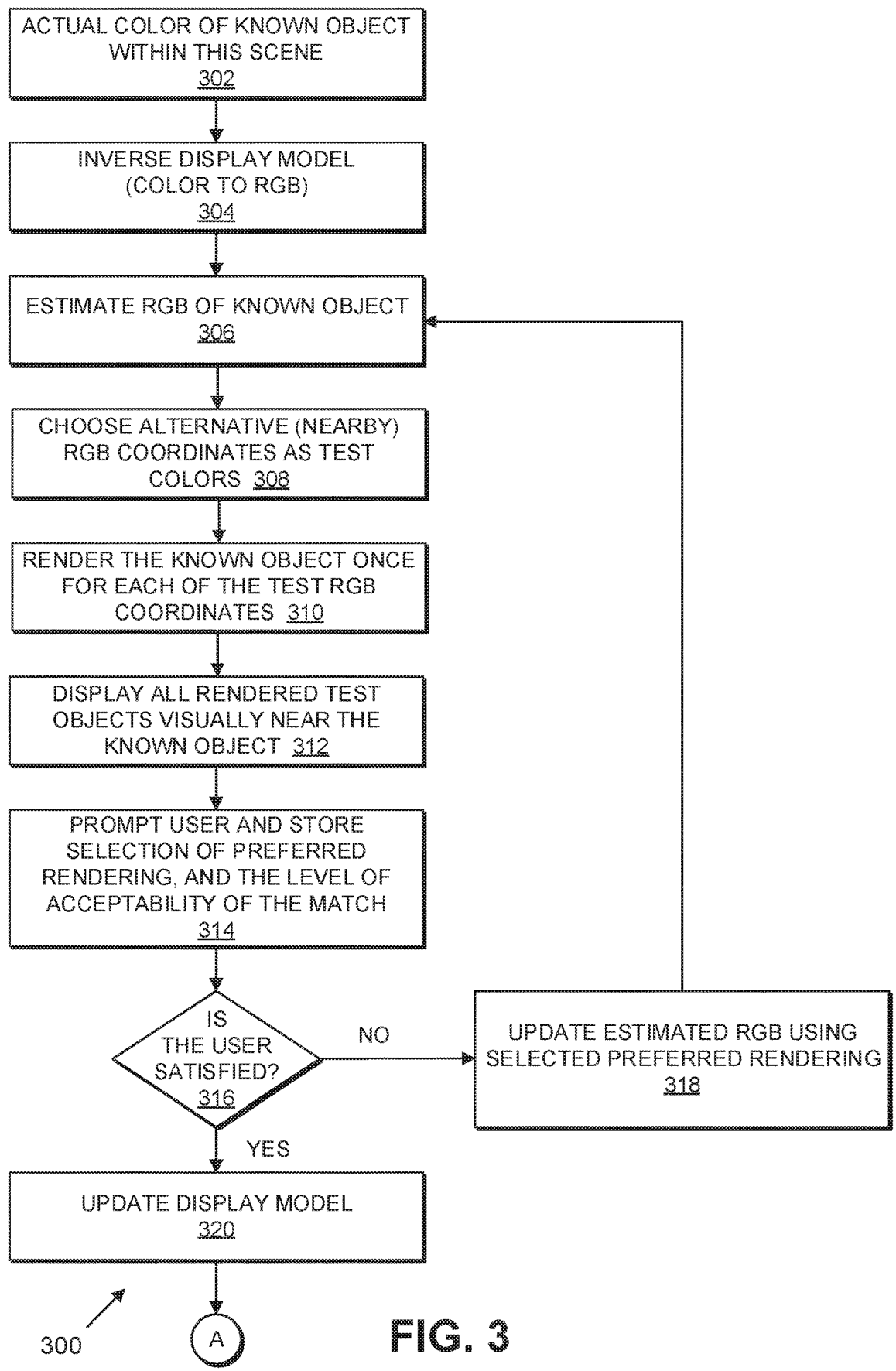
FIG. 3 depicts an outline of a user-involved color calibration procedure, for a traditional AR display system, in accordance with at least one embodiment.

FIG. 3 depicts an outline of a user-involved color calibration procedure for a traditional AR display system in accordance with at least one embodiment. An AR display system used in FIG. 3 is in line with use case 1; it does not include an internal measurement imaging device (i.e., it is a traditional AR display system and therefore does not include an inside camera) for viewing content rendered on an AR display surface. The procedure of FIG. 3 is shown as flow diagram 300.

In procedure 300, step 302 illustrates the actual color of a known object within the scene. The actual color of a known object in an AR scene is input to an inverse display model to convert the color data to RGB data at step 304. With this, an estimate of the RGB data of the known object is made at step 306. Next, the procedure includes selecting alternative (nearby) RGB coordinates as test colors 308. This selection may be carried out by a processor using a test-color generation algorithm. A number of alternative coordinates selected is not limited except to maintain a reasonable interface for a user at step 310. A larger number of selected alternative coordinates provides faster convergence towards a preferred display calibration. Next, the procedure includes rendering the known object using each of the selected test colors and displaying each rendering visually near the known object at step 312. In some embodiments, the entire known object is rendered. In some embodiments, only a representative portion of the known object is rendered. In various embodiments, an amount of the known object that is rendered is based on a size of the known object. At step 314, the procedure then prompts the user to select which displayed rendering is a closest visual match to the known object. In at least one embodiment, step 314 includes a prompt that further requests the user to select a level of closeness (i.e., acceptability) of the match. If the user is not satisfied at decision 316, with a level of closeness of the match, the procedure 300 includes updating the estimate of the RGB data of the known object based on the RGB data of the preferred rendering 318 and the procedure 300 is repeated starting from the corresponding step 306. If the user is satisfied with the level of closeness of the match, the procedure 300 includes, at step 320, updating a display model using the RGB data of the selected rendering and the actual color of the known object. Then the procedure 300 ends and procedure 100 in FIG. 1 is reinitiated. The display model parameters can be re-optimized to account for the new information (the newly determined RGB to color match parameters).

Figure 4:
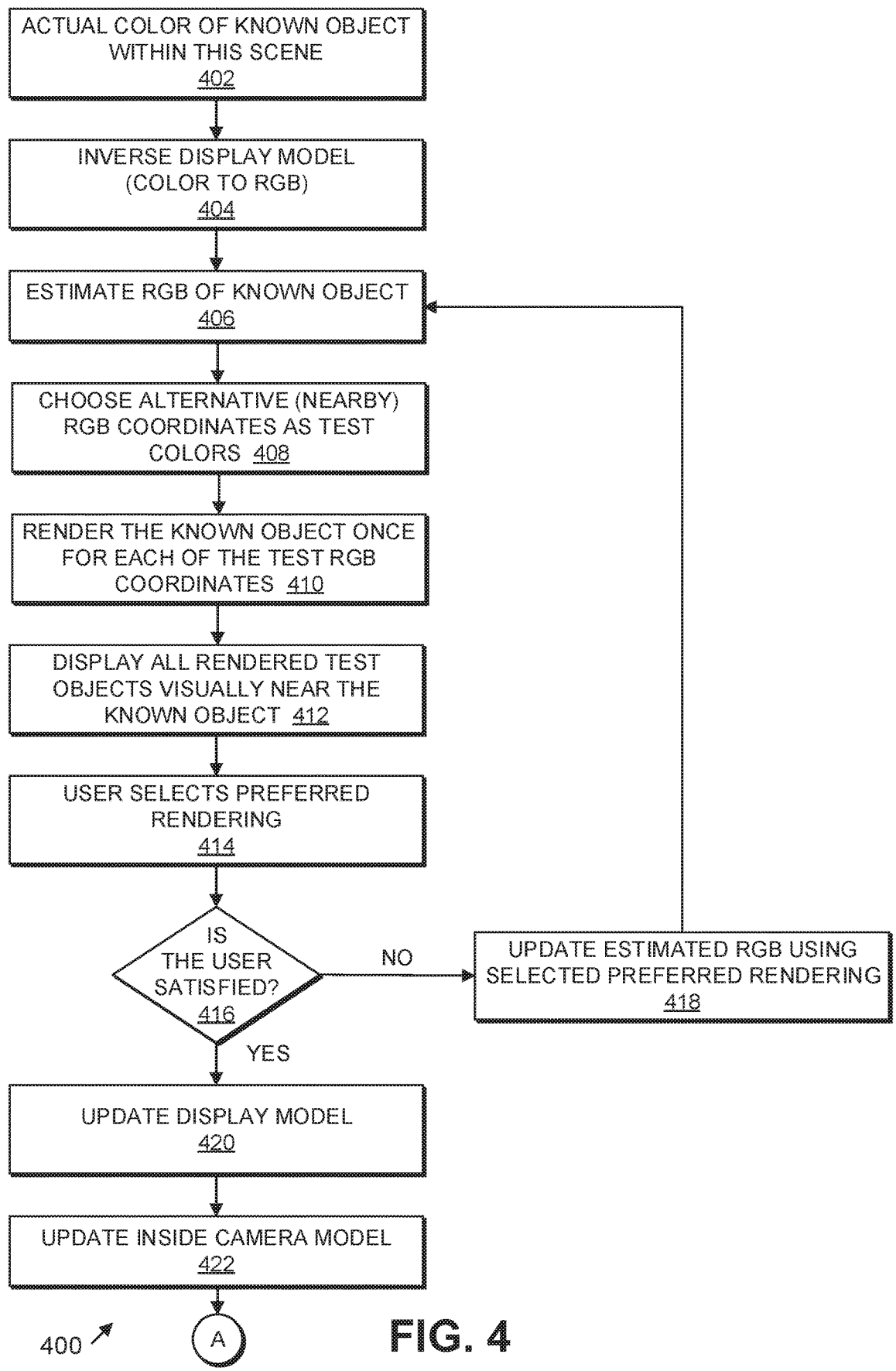
FIG. 4 depicts an outline of a user-involved color calibration procedure, for an AR display system that includes an internal measurement imaging device, in accordance with at least one embodiment.

FIG. 4 depicts an outline of a user-involved color calibration procedure, for an AR display system that includes an internal measurement imaging device, in accordance with at least one embodiment. An AR display system used in FIG. 4 is in line with use case 2; it does include an internal measurement imaging device (e.g., an inside camera) for viewing content rendered on an AR display surface. The procedure of FIG. 4 illustrates flow 400.

In flow 400, the actual color of a known object in an AR scene (as determined by procedure 100) is input to an inverse display model to convert the color data to RGB data at step 402. With this, an estimate of the RGB data of the known object is made by inversing display model (color to RGB) 404 and estimated the RGB of a known object 406. Next, the procedure 400 includes selecting alternative (nearby) RGB coordinates as test colors 408. A number of alternative coordinates selected is not limited except to maintain a reasonable interface for a user. A larger number of selected alternative coordinates provides faster convergence towards a preferred display calibration. Next, the procedure 400 includes rendering the known object using each of the selected test colors 410 and displaying each rendering visually near the known object at step 414. In some embodiments, the entire known object is rendered. In some embodiments, only a representative portion of the known object is rendered. In various embodiments, an amount of the known object that is rendered is based on a size of the known object. A user selects which displayed rendering is a closest visual match to the known object (i.e., is preferred) at step 414. In at least one embodiment, the prompt further requests the user to select a level of closeness (i.e., acceptability) of the match at decision 416. If the user is not satisfied with a level of closeness of the match, at step 418, the procedure 400 includes updating the estimate of the RGB data of the known object based on the RGB data of the preferred rendering and the procedure 400 is repeated starting from the corresponding step. If the user is satisfied with the level of closeness of the match, at step 420, the procedure 400 includes updating a display model using the RGB data of the preferred rendering and the actual color of the known object. The procedure 400 differs from the procedure 100, in that procedure 400 further includes updating an inside camera model at step 422, using the RGB data of the preferred rendering and the actual color of the known object. Then the procedure 400 ends and procedure 100 is reinitiated at step 104 as shown by identifier "A".

Figure 5:
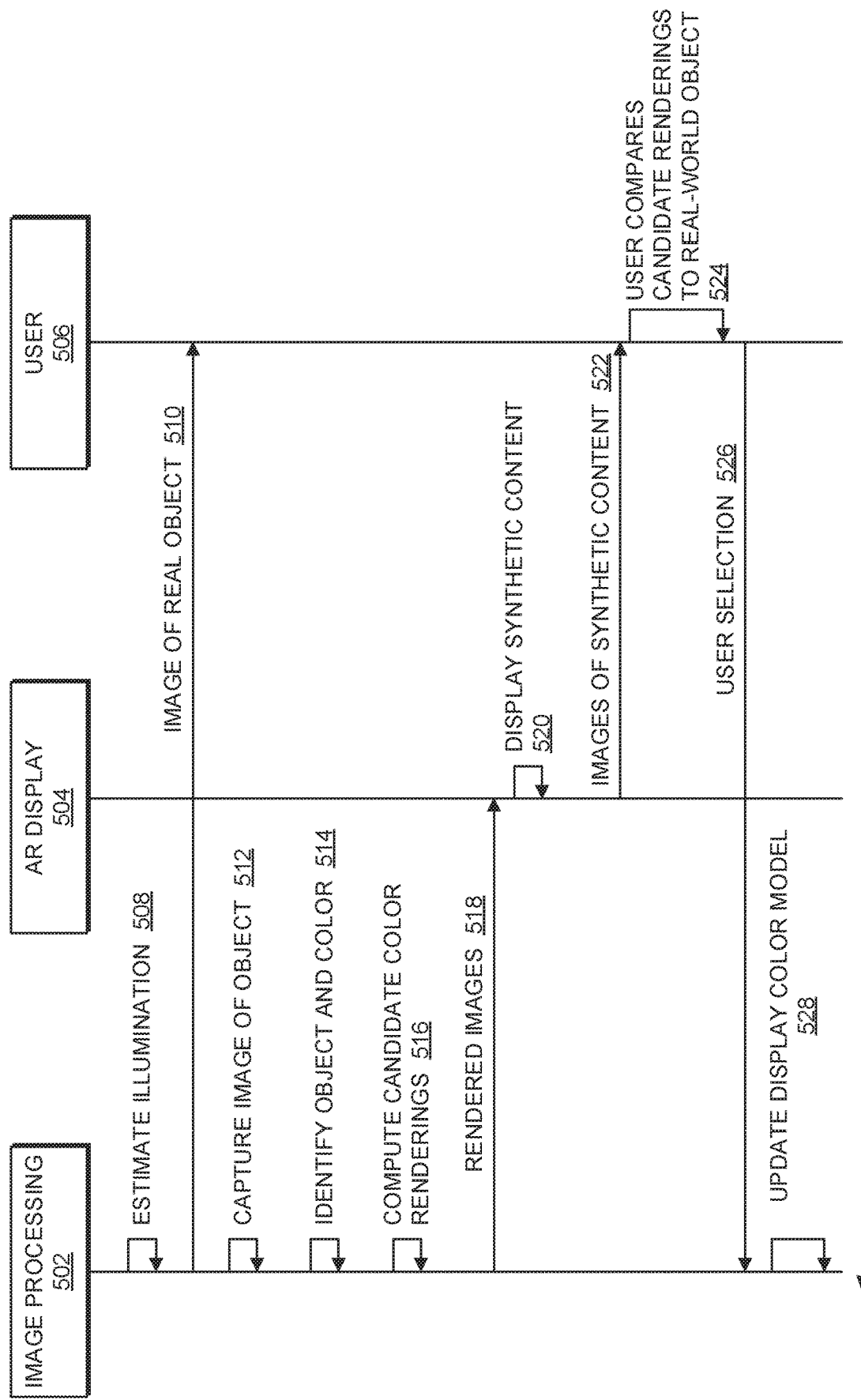
FIG. 5 depicts a sequence diagram of a user-involved process for maintaining color calibration using common objects in a field of view, in accordance with at least one embodiment.

FIG. 5 depicts a sequence diagram 500 of a user-involved process for maintaining color calibration using common objects in a field of view, in accordance with at least one embodiment. FIG. 5 illustrates operations performed by an image processing component 502, an AR display component 504, and a user component 506. The image processing component estimates a current illumination condition 508. A real-world object is visible to the user through the AR display 510. The image processing component captures an image of the real-world object 512. Then, the image processing component identifies the real-world object and its color. The image processing component computes candidate color renderings 516 and sends the renderings to the AR display component 518. The AR display component displays the synthetic content (i.e., the renderings) 520. The synthetic content 522 is visible to the user via the AR display. Then the user compares the candidate renderings to the real-world object at step 524 and selects a preferred rendering 526. The user selection is sent to the image processing component which uses this feedback to update the display color model at 528.

FIG. 6 depicts an outline of a fully-automated color calibration procedure 600, for an AR display system that includes an internal measurement imaging device, in accordance with at least one embodiment. An AR display system used in FIG. 6 is in line with use case 3 shown in table 200; it does include an internal measurement imaging device (e.g., an inside camera) for viewing content rendered on an AR display surface.

In procedure 600, the actual color of a known object in an AR scene 602 (as determined by procedure 100) is input to an inverse display model to convert the color data to RGB data 604. With this, an estimate of the RGB data of the known object is made at step 606. Next, the procedure includes selecting alternative (nearby) RGB coordinates as test colors at step 608. This selection may be carried out by a processor using a simple test-color generation algorithm. A number of alternative coordinates selected is not limited except to maintain a reasonable interface for a user. A larger number of selected alternative coordinates provides faster convergence towards a preferred display calibration. Next, the procedure includes rendering a portion of the known object using each of the selected test colors at step 610 and displaying each rendering visually near the known object at step 612. In embodiments wherein multiple alternative colors are displayed, the processor selects different areas of the known object to render. The procedure 600 then includes the inside camera detecting the color of the known objects and all rendered pieces at step 614. The processor selects the alternative RGB data that is a closest color match to that of the known object at step 616. At decision 618, it is determined whether the color match is less than the target max color difference. If there is not a sufficient level of closeness of the match, at step 620, the procedure 600 includes updating the estimate of the RGB data of the known object based on the RGB data of the preferred rendering and the procedure 600 is repeated starting from the corresponding step 606. If there is a sufficient level of closeness of the match, the procedure 600 includes updating a display model using the RGB data of the selected rendering and the actual color of the known object at step 622. Then the procedure 600 ends and procedure 100 is reinitiated at step 104.

The listed steps below are a supplementary description of procedure 600.

Step 1. Identify a Candidate Object in the Field of View:

The processor determines, by using an image processing algorithm, if an object in the current field of view of the forward facing camera is in the known-object database. This algorithm could account for any of the properties listed previously. In some embodiments, several of these properties are compared. For example, after detecting a bright red object, the number of potential objects in the database can be greatly reduced, and then a second property could be compared, and so on. The literature on object detection and identification is very deep, and any number of published methods could be applied and possibly combined to achieve the necessary level of performance for a given AR application.

Step 2. Estimate a Spectral Power Distribution (SPD) of Illumination:

Estimating the SPD may be carried out by any number of means established in the literature. The forward facing camera or other component may be used for accurate estimation of a current illumination. In some embodiments, illumination estimation may be performed using techniques described in "Effective Learning-Based Illuminant Estimation Using Simple Features," by Cheng, Price, Cohen, and Brown (IEEE CVPR2015).

Step 3. Estimate the Display RGB Coordinates of the Known Object:

Estimating the effective reflectance of the object may be done by using the forward facing camera and accounting for the illumination estimated in step 2 and the known reflectance of the object from step 1. One exemplary estimate of the light reaching the observer (radiance) is the product of illumination and reflectance. If more complex geometric properties are available (e.g. BRDF), they can be applied here to improve the estimate of what the observer views. The radiance calculated thusly does not yet account for goggle properties. After applying the transmittance of the goggles, the resulting radiance is a useful estimate of light incident on the observers eye as well as the inside camera. This spectral radiance is converted to color using the estimated light source and known CIE transforms. This color is processed through the inverse display model to estimate the RGB that would be required to match said color.

Step 4. Process the Calibration and Update a Display Color Reproduction Model:

It is possible that several objects are identified and, their properties estimated, before a single re-calibration is performed. For each object, the color coordinates are mapped to estimated RGB coordinates of the AR display. The estimated RGB coordinates are displayed by the AR goggles within or near the object, and the forward facing camera detects the color of both. A difference between target and actual colors is determined for several objects, and then a display model is updated. This procedure can be repeated as necessary until the final estimated and measured colors are below a color difference threshold. The color distance threshold may be a predefined value or a user-adjustable value. The International Colour Consortium (ICC) website, www.color.org/displaycalibration.xalter, is one valid reference for camera calibration techniques. The ICC has established methods by which a display can be calibrated and outlines the processing and communication used to operate such a calibrated display.

The rendering of accurate colors is both limited and complicated by the transparent nature of the AR goggles. Techniques that account for these complications are described below.

Step 5. Update the Object Color and Potentially Iterate:

First, the system updates the RGB coordinates of the object, redisplays the renderings, and reimages the renderings as well as the real-world object with the camera. Then the system checks the color difference between the rendering and the target object color. If the color difference is below the threshold, the process is complete. If the color difference is above the threshold, the process repeats steps 4 and 5.

Figure 7:
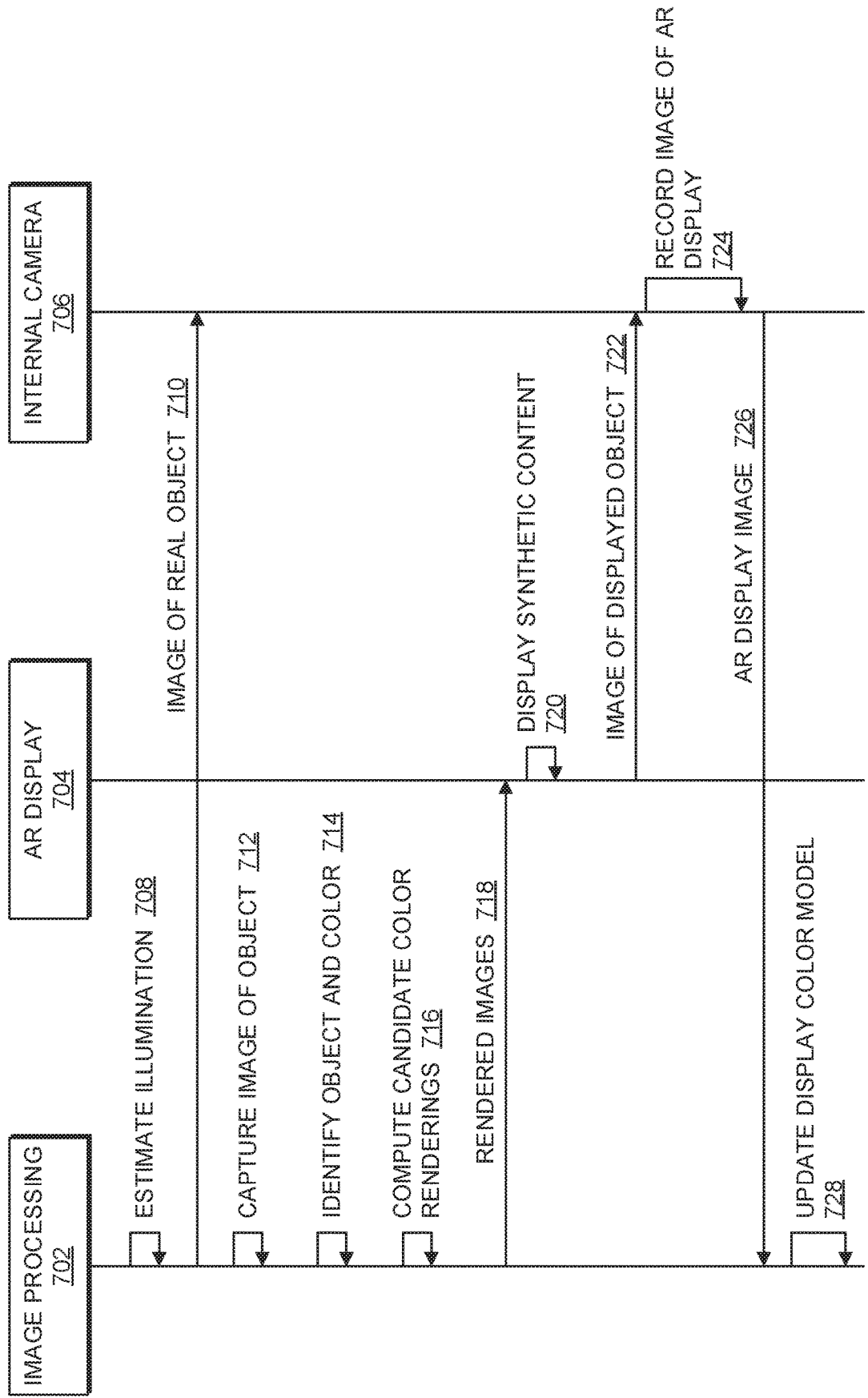
FIG. 7 depicts a sequence diagram of a fully-automated process for maintaining color calibration using common objects in a field of view, in accordance with at least one embodiment.

FIG. 7 depicts a sequence diagram 700 of a fully-automated process for maintaining color calibration using common objects in a field of view, in accordance with at least one embodiment. FIG. 7 includes an image processing component 702, an AR display component 704, and an internal camera component 706. The image processing component 702 estimates a current illumination condition 708. A real-world object is visible to the internal camera component through the AR display 710. The image processing component captures an image of the real-world object 712. Then, the image processing component identifies the real-world object and its color 714. The image processing component computes candidate color renderings and sends the renderings to the AR display component 716. The AR display component displays the synthetic content (i.e., the renderings) 720. The synthetic content is visible to the internal camera component 722. The image of displayed object is provided to the internal camera 722. Then the internal camera component captures/records an image of the various candidate renderings and the real-world object 724, both visible at the AR display. The image of the AR display is sent to the image processing component 726 which uses this feedback to update the display color model 728.

FIG. 8A depicts a visual overview 800 of a first example scenario involving a traditional HMD, and FIG. 8B depicts a corresponding AR color calibration interface view 850 presented to a user, in accordance with at least one embodiment. The overview of FIG. 8A includes a viewer 806, an AR visor 804, a synthetic content overlay visible to the viewer and displayed by the AR visor 804, and an identified real-world object 802 also visible to the viewer through the AR visor 804. The AR visor 804 is part of an HMD that carries out the color calibration process taught herein. The AR system presents the AR color calibration interface 850 of FIG. 8B to the viewer. At this point, the synthetic content overlay includes the AR color calibration interface. In some embodiments the interface includes a prompt to select a closest color or preferred option and at least one candidate RGB color option in the form of a rendering of the identified real-world object. In other embodiments the interface includes a set of candidate RGB color options as renderings of the identified real-world object. FIG. 8B illustrates an interface that allows a user to select a closest color by choosing option A 852, or option B 856 as compared to a "real" object 854. The AR system receives a viewer input via a user interface identifying a selected option. The AR system may iterate the calibration process by presenting new options to the viewer and receiving new viewer input. At each iteration a display calibration model is updated using the color parameters of the viewers selection in comparison with the known parameters of the identified real-world object. In one embodiment, a display color calibration model is adjusted so that when the AR system renders a synthetic content overlay which includes the known colors of the identified real-world object, those colors are rendered using the RGB value of the selected option. FIGS. 8A-8B relate to embodiments of the system and method of this disclosure that include traditional HMDs. A traditional HMD does not include a camera that views the synthetic content overlay displayed by the AR visor. Such a system could carry out procedures 100 and 300 described above.

FIG. 9A depicts a visual overview of a first example scenario involving an HMD with an internal measurement camera, and FIG. 9B depicts a corresponding AR color calibration interface view presented to a user, in accordance with at least one embodiment. The overview of FIG. 9A illustrates an identified real-world object 902, an AR visor 904 of an HMD, a synthetic content overlay visible to the viewer and displayed by the AR visor 904, and an identified real-world object 902 also visible to the viewer through the AR visor 904. The HMD includes an inside camera 906 that views a combined image of the synthetic content overlay and the identified real-world object at the AR visor 904. Such an AR system presents the AR color calibration interface of FIG. 9B to the viewer. At this point, the synthetic content overlay includes the AR color calibration interface. In some embodiments the interface includes a prompt for a user to select a closest color or preferred option and at least one candidate RGB color option in the form of a rendering of the identified real-world object. In other embodiments the interface includes simply a set of candidate RGB color options as renderings of the identified real-world object. In a fully-automated embodiment, such as the one depicted in FIG. 9B, the interface 950 includes a single color option rendering and the inside camera images the real-world object and the color option rendering. The image data is sent to the processor of the HMD to be used as input to update the AR display color calibration model. The AR system may iterate the calibration process by presenting new options to the inside camera and receiving new image data as input. At each iteration the display calibration model is updated using the color parameters of the rendered option if a color match between the rendered option 954 and the real-world object 952, as determined by an image analysis algorithm that uses the inside camera image data, is better. In one embodiment, a display color calibration model is adjusted so that when the AR system renders a synthetic content overlay which includes the known colors of the identified real-world object, those colors are rendered using the RGB value of the selected option. FIGS. 9A-9B relate to embodiments of the system and method of this disclosure that include HMDs with inside cameras able to view an AR visor. Such a system could carry out procedures 100, 300, 400, and 600 described above.

Figure 10A:
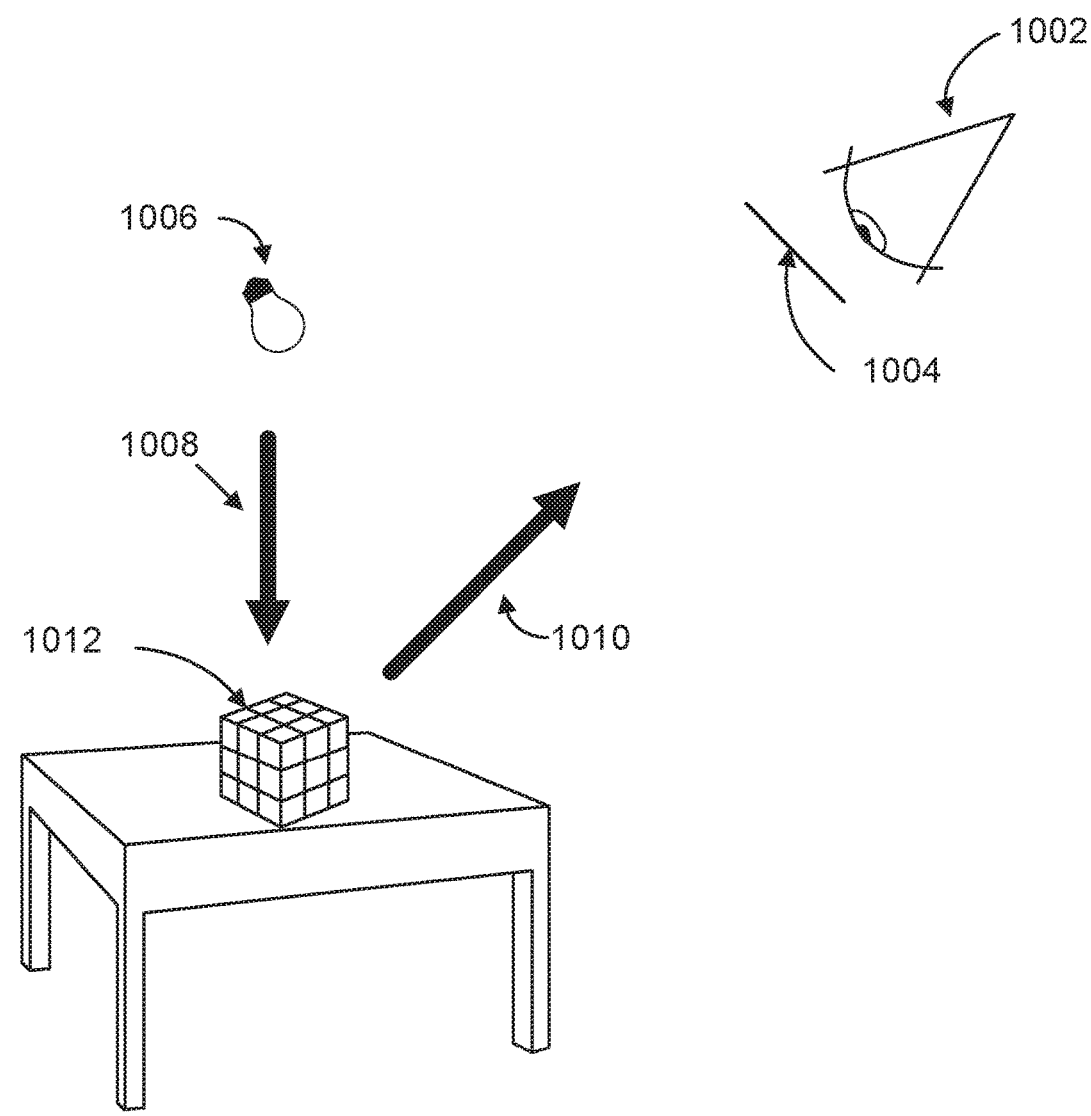
FIG. 10A depicts a second example scenario involving a traditional AR display.
Figure 10B:
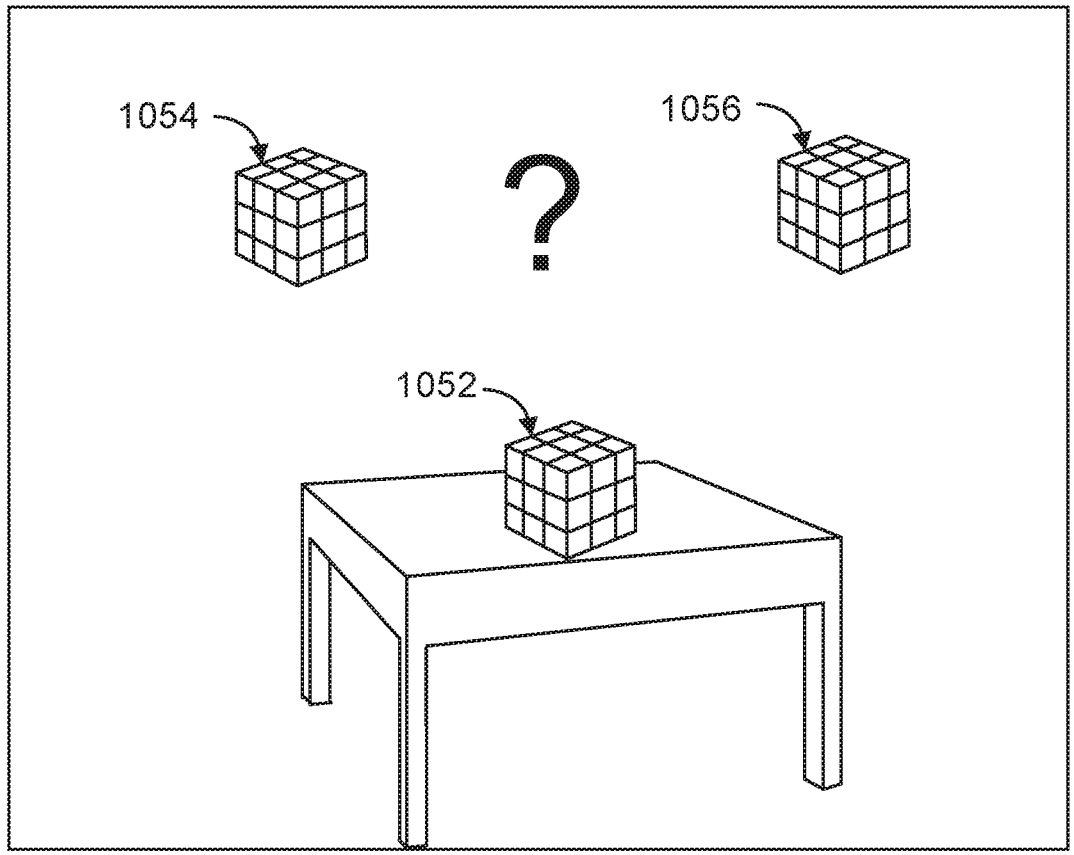
FIG. 10B depicts a corresponding AR color calibration interface view presented to a user, in accordance with at least one embodiment.

FIG. 10A depicts a second example scenario 1000 involving a traditional AR display, and FIG. 10B depicts a corresponding AR color calibration interface view 1050 presented to a user, in accordance with at least one embodiment. The example scenario depicted in FIG. 10A includes an observer 1002 looking through an AR display (e.g., a glass see through AR visor) 1004 at an object 1012 that is sitting on a table. A light source 1006 provides incident light which is reflected off the object 1008 and towards the observer 1010. The reflected light passes through the AR display 1004.

In FIGS. 10A-10B the object is a Rubik's cube. FIG. 10B depicts the observer's view through the AR visor 1050. The observer's view includes the real-world Rubik's cube 1052, two synthetic renderings 1054, 1056 of a Rubik's cube each with slightly altered colors, and a synthetic rendering of a question mark to prompt the observer to select which synthetic Rubik's cube more closely matches the real-world Rubik's cube. The question mark is inserted imagery to indicate to the observer that a choice needs to be made. cubes 1054 and 1056 represent synthetic imagery with slightly altered color.

Figure 11A:
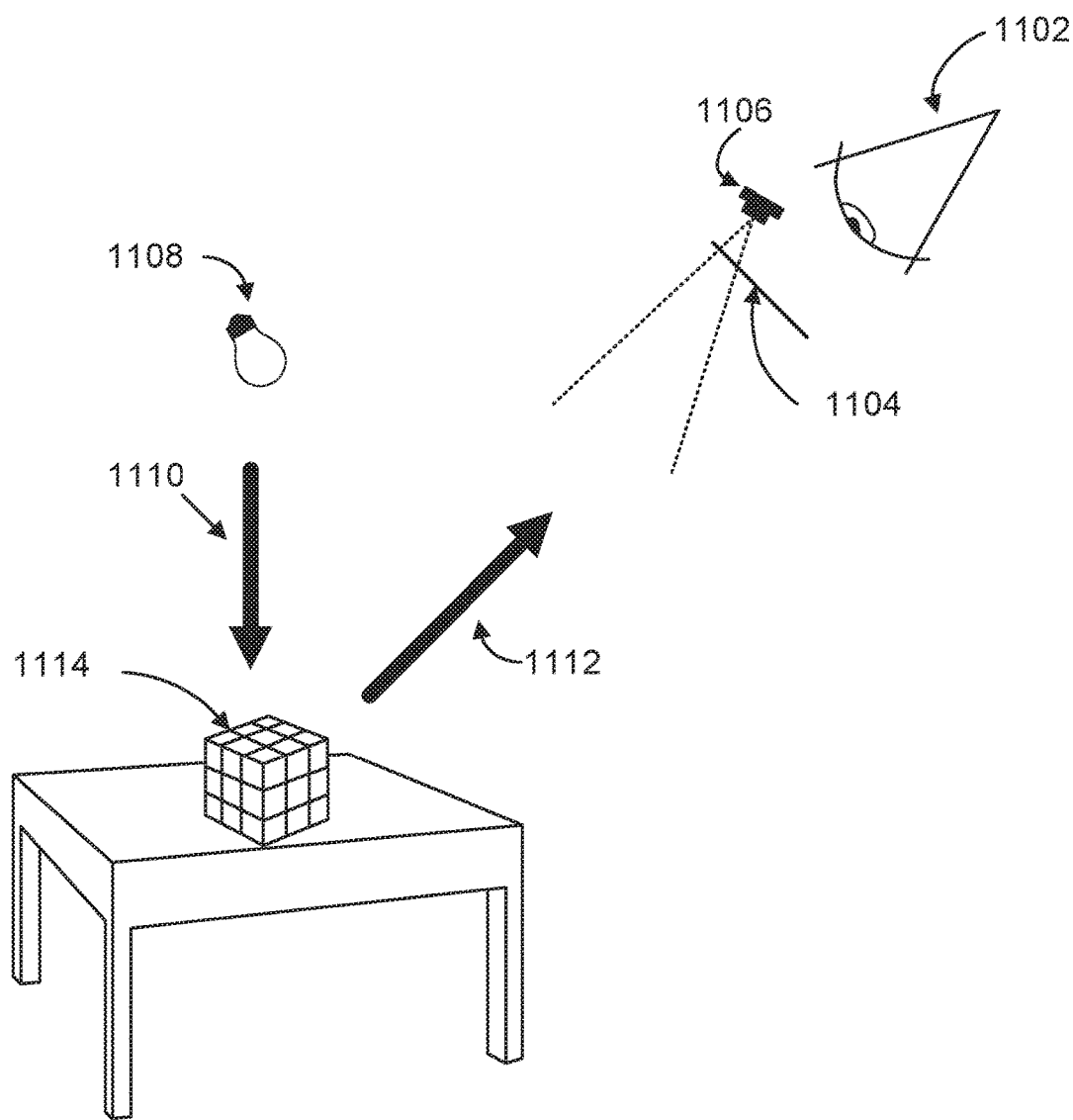
FIG. 11A depicts a second example scenario involving an AR display with an internal measurement camera.
Figure 11B:
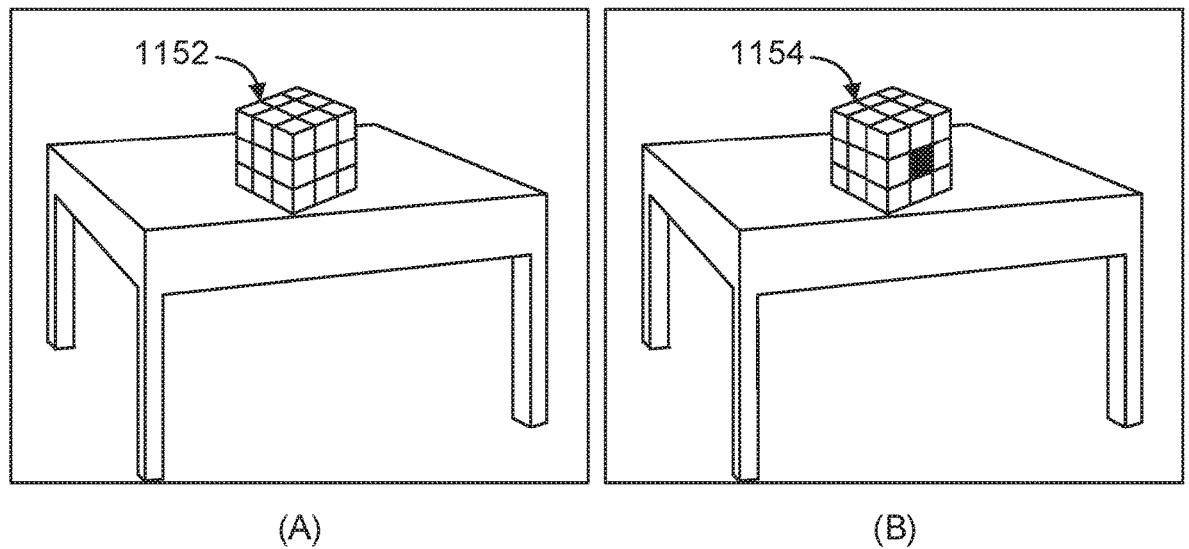
FIG. 11B depicts a corresponding AR color calibration interface view presented to a user, in accordance with at least one embodiment.

FIG. 11A depicts a second example scenario 1100 involving an AR display 1104 with an internal measurement camera 1106, and FIG. 11B depicts a corresponding AR color calibration interface view presented to a user, in accordance with at least one embodiment. The example scenario depicted in FIG 11A 1100 includes an observer looking through an AR display (e.g., a glass see through AR visor 1104) at an object 1114 that is sitting on a table. A light source 1108 provides incident light which is reflected off the object 1110 and towards the observer 1112. The reflected light passes through the AR display 1104 and is viewed by the observer 1102 and by an inside camera 1106. In FIGS. 11A-11B the object is a Rubik's cube. FIG. 11B depicts the observer's view through the AR visor before "A" and after "B" of a synthetic test rendering of the Rubik's cube is inserted into the observers FOV via the AR display. At first, the observer's view ("A") 1152 includes the real-world Rubik's cube on a table and this view is also visible to the inside camera. The inside camera, or another camera sends image data to a processor that then identifies the Rubik's cube as an object in a known-object database. Next, a synthetic test image of a Rubik's cube is overlaid using the AR visor and this new view ("B") 1154 is visible to both the observer and the inside camera. The inside camera sends image data to the processor that then adjusts a color rendering schema for the AR visor based on a difference between view (a) and view (b).

Referring now to FIGS. 12A and 12B exemplary configurations of AR systems 1200 and 1250 are illustrated. In the schematic illustrations, the camera 1202 and 1252, respectively is mounted behind the display surface of the goggles, but outside the observer's view (e.g. above, below, or to the side of the observer's view). In some embodiments, the AR system is provided with eye tracking to align the camera image with the user's view. In FIG. 12A, the camera is shown coupled to control module 1204, which is coupled to waveguide 1206 and LCD 1208. Likewise, in FIG. 12B, camera 1252 is coupled to control module 1254, as is LCD 1256. Also illustrated in FIG. 12B is partly-reflective surface 1258.

Rendering Display Colors in the Presence of Ambient Background.

A traditional color display model relates the device RGB coordinates to the output radiance (or color) of the display. More advanced models also account for the ambient room conditions (flare). AR goggles present the additional complication of spatially-varying ambient light from the scene passing through the goggles, this light being observable by the user adjacent to, or overlapping with the AR display imagery. Exemplary embodiments may address this issue as follows.

Consider an embodiment in which there is an outside forward facing camera that detects the ambient light seen by the observer, and further that the processor operates to determine the spatial relationship between this ambient light and the internal AR display. The result is that the processor has access to the aligned radiance or color of the light seen by the observer at each pixel location in the AR display. Since the AR display and the real world are aligned, the spatial coordinates x,y below are for both systems.

From the traditional display model, the spectral radiance L may be calculated, leaving the AR display toward the observer from a given pixel x,y and the input R,G,B color coordinates:

$$L_{\lambda,x,y}^{display} = f_1(R,G,B)$$

Note that the $\lambda$ subscript indicates the parameter is quantified spectrally. Note further that the display model $f_1$ is independent of the location on the display. The contribution from the ambient light is based upon the camera model $f_2$:

$$L_{\lambda,x,y}^{ambient} = f_2(R,G,B) \cdot T_{\lambda,x,y}^{display}$$

Note that again, the camera model $f_2$ is independent of the location of the pixel. $T_{\lambda,x,y}^{display}$ represents the spectral transmittance of the display at the given pixel. The total radiance seen by the observer is the sum of the two parts:

$$L_{\lambda,x,y}^{total} = L_{\lambda,x,y}^{ambient} + L_{\lambda,x,y}^{display}$$

Therefore the input color to the final display model operates to account for the ambient contribution. This will place some limits on the available display colors. The ambient light passing through the goggles imposes a lower limit on the radiance that can be presented to the observer, even when the AR display is completely off.

In some embodiments, for color-critical applications the observer may be instructed to maintain a viewpoint free of bright real-world areas. In practice, the benefit of directing an observer to a dim region depends on the type and quality of light blocking available in the particular goggles. In some embodiments, the AR system includes technology that fully passes light where there is no AR image, and fully blocks the light anywhere there is an AR image. In such embodiments, the value of ambient radiance as noted above may be zero for regions in which light is fully blocked.

Variations on the Solution.

The table/chart 200 in FIG. 2 provides three exemplary scenarios in which the teachings disclosed herein may be applied. Other combinations of user input and imaging capabilities may be considered as well.

In a more complicated embodiment, the database of object properties includes a Bidirectional Reflectance Distribution Function for some or all objects. Utilizing this data improves accuracy when estimating an effective reflectance of a given object. However, this is a much more computationally taxing application, since various directional aspects of real-world lighting of the object are accounted for.

Other Discussion.

Figure 13:
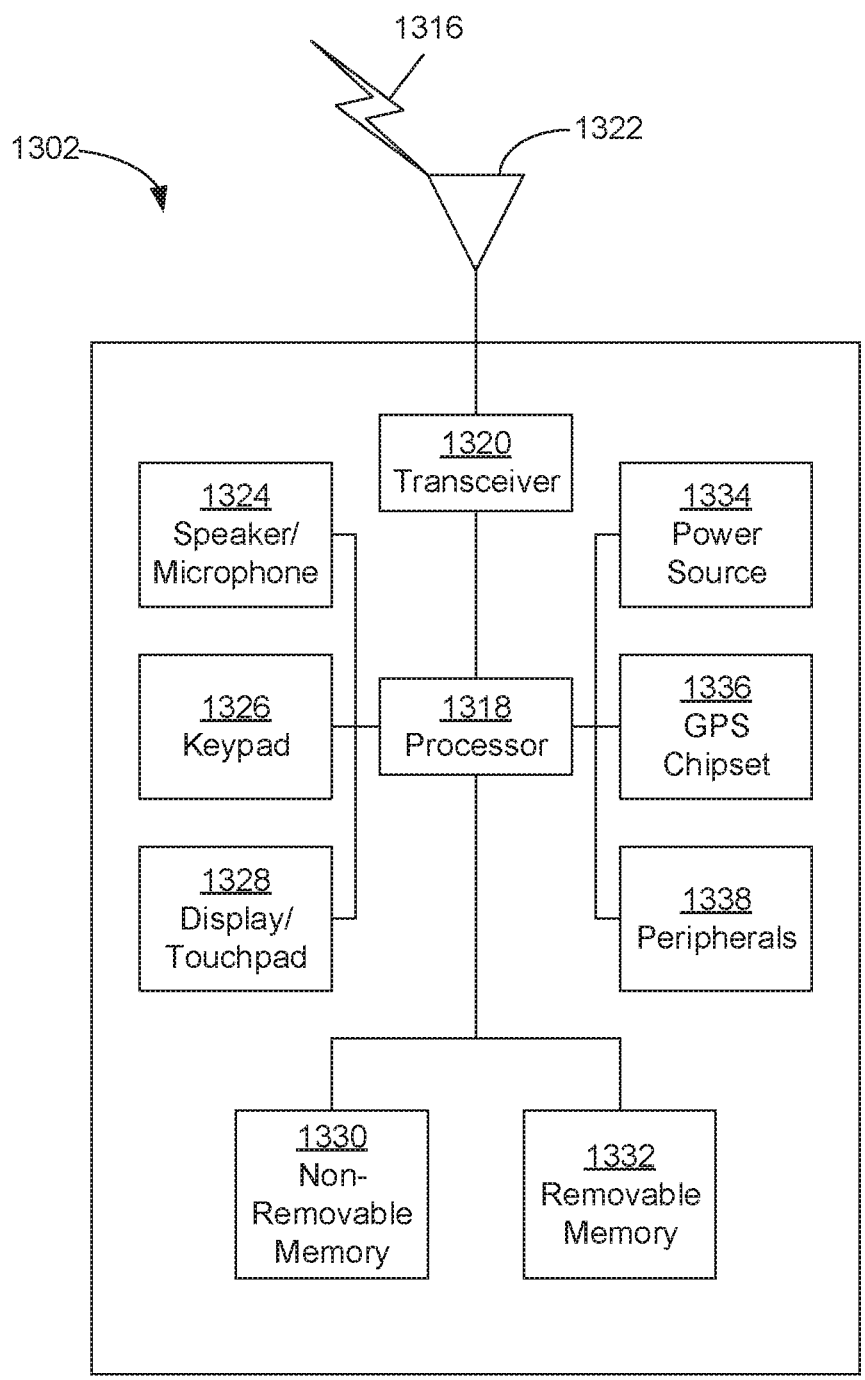
FIG. 13 illustrates an exemplary wireless transmit-receive unit that may be used to implement an AR display in some embodiments.

FIG. 13 is a system diagram illustrating an example wireless transmit-receive unit (WTRU) 1302 that may be employed as a head-mounted AR display in exemplary embodiments. As shown in FIG. 13, the WTRU 1302 may include a processor 1318, a transceiver 1320, a transmit/receive element 1322, a speaker/microphone 1324, a keypad 1326, a display/touchpad 1328, non-removable memory 1330, removable memory 1332, a power source 1334, a global positioning system (GPS) chipset 1336, and/or other peripherals 1338, among others. It will be appreciated that the WTRU 1302 may include any sub-combination of the foregoing elements while remaining consistent with an embodiment.

The processor 1318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1318 may perform signal coding, data processing, power control, input/output processing, and/or any other functionality that enables the WTRU 1302 to operate in a wireless environment. The processor 1318 may be coupled to the transceiver 1320, which may be coupled to the transmit/receive element 1322. While FIG. 13 depicts the processor 1318 and the transceiver 1320 as separate components, it will be appreciated that the processor 1318 and the transceiver 1320 may be integrated together in an electronic package or chip.

The transmit/receive element 1322 may be configured to transmit signals to, or receive signals from, a base station (e.g., the base station 1314a) over the air interface 1316. For example, in one embodiment, the transmit/receive element 1322 may be an antenna configured to transmit and/or receive RF signals. In an embodiment, the transmit/receive element 1322 may be an emitter/detector configured to transmit and/or receive IR, UV, or visible light signals, for example. In yet another embodiment, the transmit/receive element 1322 may be configured to transmit and/or receive both RF and light signals. It will be appreciated that the transmit/receive element 1322 may be configured to transmit and/or receive any combination of wireless signals.

Although the transmit/receive element 1322 is depicted in FIG. 13 as a single element, the WTRU 1302 may include any number of transmit/receive elements 1322. More specifically, the WTRU 1302 may employ MIMO technology. Thus, in one embodiment, the WTRU 1302 may include two or more transmit/receive elements 1322 (e.g., multiple antennas) for transmitting and receiving wireless signals over the air interface 1316.

The transceiver 1320 may be configured to modulate the signals that are to be transmitted by the transmit/receive element 1322 and to demodulate the signals that are received by the transmit/receive element 1322. As noted above, the WTRU 1302 may have multi-mode capabilities. Thus, the transceiver 1320 may include multiple transceivers for enabling the WTRU 1302 to communicate via multiple RATs, such as NR and IEEE 802.11, for example.

The processor 1318 of the WTRU 1302 may be coupled to, and may receive user input data from, the speaker/microphone 1324, the keypad 1326, and/or the display/touchpad 1328 (e.g., a liquid crystal display (LCD) display unit or organic light-emitting diode (OLED) display unit). The processor 1318 may also output user data to the speaker/microphone 1324, the keypad 1326, and/or the display/touchpad 1328. In addition, the processor 1318 may access information from, and store data in, any type of suitable memory, such as the non-removable memory 1330 and/or the removable memory 1332. The non-removable memory 1330 may include random-access memory (RAM), read-only memory (ROM), a hard disk, or any other type of memory storage device. The removable memory 1332 may include a subscriber identity module (SIM) card, a memory stick, a secure digital (SD) memory card, and the like. In other embodiments, the processor 1318 may access information from, and store data in, memory that is not physically located on the WTRU 1302, such as on a server or a home computer (not shown).

The processor 1318 may receive power from the power source 1334, and may be configured to distribute and/or control the power to the other components in the WTRU 1302. The power source 1334 may be any suitable device for powering the WTRU 1302. For example, the power source 1334 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1318 may also be coupled to the GPS chipset 1336, which may be configured to provide location information (e.g., longitude and latitude) regarding the current location of the WTRU 1302. In addition to, or in lieu of, the information from the GPS chipset 1336, the WTRU 1302 may receive location information over the air interface 1316 from a base station and/or determine its location based on the timing of the signals being received from two or more nearby base stations. It will be appreciated that the WTRU 1302 may acquire location information by way of any suitable location-determination method while remaining consistent with an embodiment.

The processor 1318 may further be coupled to other peripherals 1338, which may include one or more software and/or hardware modules that provide additional features, functionality and/or wired or wireless connectivity. For example, the peripherals 1338 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1338 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 1302 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 1318). In an embodiment, the WRTU 1302 may include a half-duplex radio for which transmission and reception of some or all of the signals (e.g., associated with particular subframes for either the UL (e.g., for transmission) or the downlink (e.g., for reception)).

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more optical processors, one or more SLMs, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in part by using a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement an image analysis engine, image rendering engine, controller, timing module, operating system, etc. for use in an AR display system.

What is claimed:

1. A method of color calibrating an augmented reality display device, the method comprising:
   estimating a real-world illuminance;
   capturing an image of a real-world object, identifying the object and accessing known color characteristics of the real-world object;
   computing a first candidate color rendering of a synthetic version of the real-world object using the real-world illuminance and the color characteristics of the real-world object;
   computing a second candidate color rendering of a synthetic version of the real-world object using the real-world illuminance and the color characteristics of the real-world object;
   displaying both candidate color renderings beside the real-world object using an AR display and prompting a user to indicate a preferred color rendering; and
   in response to the user indication, updating a display color model used for producing future candidate renderings and synthetic AR content based on characteristics of the indicated rendering.

2. The method of claim 1, wherein estimating the real-world illuminance comprises comparing the captured image of the real-world object with the known color characteristics of the real-world object.

3. The method of claim 1, wherein capturing the image of the real-world object comprises capturing the image with a forward-facing camera of an HMD.

4. The method of claim 1, wherein the first and second candidate color renderings are based on expected temporal variations in the display rendering characteristics.

5. The method of claim 1, wherein the candidate color renderings comprise patches of the dominant color of the real-world object.

6. The method of claim 1, wherein the candidate color renderings comprise synthetic versions of the entire real-world object.

7. The method of claim 1, wherein prompting the user comprises prompting the user via at least one of a synthetic overlay displayed by the AR device, an audible request generated by the AR device, and a haptic notification emitted by the AR device.

8. The method of claim 1, wherein the display color model is used to adjust a display color calibration of the AR system.

9. The method of claim 1, wherein the steps of computing the first candidate color rendering, computing the second candidate color rendering, displaying both candidate color renderings, and updating the display color model are executed iteratively.

10. The method of claim 9, wherein the iterative execution is terminated after a predetermined number of iterations.

11. The method of claim 9, wherein the iterative execution is terminated in response to a user input indicating a request for calibration termination.

12. A method of color calibrating an augmented reality display device, the method comprising:
    estimating a real-world illuminance;
    capturing an image of a real-world object, identifying the real-world object and accessing known color characteristics of the real-world object;
    computing a candidate color rendering of a synthetic version of the real-world object using the real-world illuminance and the color characteristics of the real-world object;
    displaying the candidate color rendering beside the real-world object using an AR display and recording an image of the display containing both the real-world object and the candidate color rendering; and adjusting a display color model used for rendering synthetic content based on a calculated difference between the image of the real-world object and the image of the displayed candidate color rendering.

13. The method of claim 12, wherein estimating the real-world illuminance comprises comparing the captured image of the real-world object with the known color characteristics of the real-world object.

14. The method of claim 12, wherein capturing the image of the real-world object comprises capturing the image with a forward-facing camera of an HMD and recording the image of the display containing both the real-world object and the candidate color rendering comprises recording the image with an inside camera of the HMD.

15. The method of claim 12, wherein capturing the image of the real-world object comprises capturing the image with a forward-facing camera of an HMD and recording the image of the display containing both the real-world object and the candidate color rendering comprises recording the image with the forward-facing camera.

16. An apparatus for color calibrating an augmented reality display, the apparatus comprising a processor configured to perform at least:

estimating a real-world illuminance;

capturing an image of a real-world object, identifying the object and accessing known color characteristics of the real-world object;

computing a first candidate color rendering of a synthetic version of the real-world object using the real-world illuminance and the color characteristics of the real-world object;

computing a second candidate color rendering of a synthetic version of the real-world object using the real-world illuminance and the color characteristics of the real-world object;

displaying both candidate color renderings beside the real-world object using an AR display and prompting a user to indicate a preferred color rendering; and in response to the user indication, updating a display color model used for producing future candidate renderings and synthetic AR content based on characteristics of the indicated rendering.

17. The apparatus of claim 16, wherein estimating the real-world illuminance comprises comparing the captured image of the real-world object with the known color characteristics of the real-world object.

18. The apparatus of claim 16, wherein capturing the image of the real-world object comprises capturing the image with a forward-facing camera of an HMD.

19. The apparatus of claim 16, wherein the display color model is used to adjust a display color calibration of the AR system.

20. The apparatus of claim 16, wherein the steps of computing the first candidate color rendering, computing the second candidate color rendering, displaying both candidate color renderings, and updating the display color model are executed iteratively.

* * * * *